United States Patent [19]

Choquet et al.

[11] Patent Number: 5,043,806
[45] Date of Patent: Aug. 27, 1991

[54] METHOD OF PROCESSING AND TRANSMITTING OVER A ("MAC" TYPE CHANNEL A SEQUENCE OF PAIRS OF STERESCOPIC TELEVISION IMAGES)

[75] Inventors: Bruno Choquet; Danielle Pele, both of Rennes; Francoise Chassaing, La Chapelle des Fougeretz, all of France

[73] Assignees: L'Etat Francais represente par le Ministre des P.T.T., Issy-les-Moucineaux; Telediffusion de France, Paris, both of France

[21] Appl. No.: 557,116

[22] Filed: Jul. 25, 1990

[30] Foreign Application Priority Data

Jul. 26, 1989 [FR] France .................... 89 10063

[51] Int. Cl.$^5$ ............................................. H04N 13/00
[52] U.S. Cl. ............................................. 358/91; 358/92; 358/142
[58] Field of Search .............. 358/92, 91, 88, 3, 141, 358/142

[56] References Cited

U.S. PATENT DOCUMENTS

| | | |
|---|---|---|
| 3,991,266 | 9/1976 | Baer . |
| 4,704,627 | 11/1987 | Yuyama et al. .............. 358/92 |
| 4,754,327 | 6/1988 | Lippert ........................ 358/92 |
| 4,905,081 | 2/1990 | Morton ......................... 358/92 |

FOREIGN PATENT DOCUMENTS 2131645 6/1984 United Kingdom .
2174266 11/1986 United Kingdom .
8400865 3/1984 World Int. Prop. O. .

OTHER PUBLICATIONS

Fernseh-und Kino-Technik, vol. 42, No. 2, Feb. 1988, pp. 67-73, Heidelberg, DE; B. Kost: "Konstruktion von Zwischenansichten für Multi-Viewpoint-3DTV-System", p. 67, col. 2, line 12 thru p. 69, col. 1, line 32.
IEEE Transactions on Consumer Electronics, vol. CE-31, No. 2, May 1985, pp. 831-87, IEEE, N.Y., U.S; P. Prabhakara et al.: "A Compatible and Economical 3D-TV System".

*Primary Examiner*—Victor R. Kostak
*Attorney, Agent, or Firm*—Fidelman & Wolffe

[57] ABSTRACT

A three-dimensional television system uses a method of processing and transmitting a sequence of pairs of stereoscopic television images by means of a transmission link comprising and analog video channel associated with a digital channel to reconstitute at the receiving end a compatible image or a three-dimensional image. The analog video channel transmits a compatible video image formed by multiplexing image items of righthand and lefthand images of pairs of stereoscopic images from the sequence.

7 Claims, 2 Drawing Sheets

METHOD OF PROCESSING AND TRANSMITTING OVER A "MAC" TYPE CHANNEL A SEQUENCE OF PAIRS OF STERESCOPIC TELEVISION IMAGES

BACKGROUND OF THE INVENTION

1. Field of the Invention

The field of the invention is that of 3D or STEREOSCOPIC television systems. The invention is more particularly concerned with a new method of processing and transmitting sequences of STEREOSCOPIC images on a data transmission link enabling reconstitution at the receiving end of either a compatible image for a conventional television or a stereoscopic image for a stereoscopic television.

2. Description of the Prior Art

The object of a stereoscopic television system is to achieve on a small screen (small in comparison with a cinema screen) the sensation of three dimensions, i.e. to enable the viewer to perceive the relative distance effect of observed points in the real scene.

The invention integrates into the existing environment of stereoscopic television systems a nd complies with the specific provisions of the "MAC" (Multiplexed Analog Component) transmission standard used for direct broadcasting satellites.

There are already known methods of transmitting sequences of images on a transmission link comprising an analog video channel and an associated "MAC" type digital channel. The actual scene observed is scanned by two synchronized cameras producing a righthand view and a lefthand view.

In the known methods of transmitting sequences of images the analog video channel of the transmission link transmits sequences of images which always corresponds to the same view (the righthand or lefthand view) and the associated digital channel transmits additional data in the form of a vector map making it possible to reconstruct the non-transmitted view from the transmitted view locally, in the stereoscopic television, to produce the 3D display.

This process favors the compatible image, so that a conventional television can easily ignore the additional data transmitted and reconstitute the sequences of images corresponding to one of the views without degrading the resulting non-3D image.

A major disadvantage of these methods is that the stereoscopic image obtained on a stereoscopic television using this information is strongly degraded, especially in "non-predictable" areas, for example if a side of an object visible in one view is not visible in the other view. What is more, these defects are accentuated if the vector map is insufficiently precise or is susceptible to transmission errors.

In the present state of the art, there is no remedy for these problems and there are no data processing methods able to eliminate these critical cases or at least make them less obvious in the resulting stereoscopic image.

Consequently, an object of the invention is a new method of processing and transmitting stereoscopic images on a link comprising an analog video channel associated with a digital channel enabling reconstitution of a stereoscopic image of sufficient quality without degrading the compatible image.

Another object of the invention is a new method of processing and transmitting stereoscopic images adapting itself to the local overall content of the stereoscopic images and to their space-time activity for simultaneous or alternate mode display of stereoscopic views.

SUMMARY OF THE INVENTION

The present invention consists in method of processing and transmitting a sequence of pairs of stereoscopic television images by means of a transmission link comprising an analog video channel associated with a digital channel to reconstitute at the receiving end of the transmission link a compatible image or a three-dimensional image, in which method the analog video channel transmits a compatible video image formed by multiplexing image items of righthand and lefthand images of pairs of stereoscopic images from the sequence.

Because the information transmitted combines the information from the righthand and lefthand images of the pairs of stereoscopic images, the reconstituted stereoscopic image does not suffer from defects due to areas which are not common to the two channels, which is not the case in the prior art. Note, however, that this defect is present in the compatible image. However, the degradation of the compatible image is less of a problem than the degradation of the stereoscopic image obtained in the prior art since the compatible image is a non-3D image.

According to another characteristic of the invention, the processing of the sequence of pairs of stereoscopic television images comprises the following stages:
  mapping the image items of a righthand image and the image items of a left hand image, said righthand and lefthand images being parts of the same pair of images or two successive pairs of images in the sequence,
  shifting image items in a righthand, respectively lefthand image according to the image items of a lefthand, respectively righthand image, said righthand and lefthand images being parts of the same pair of images or two successive pairs of images in the sequence.

Mapping image items makes it possible to shift the image items transmitted in an encoder or a decoder by transmitting a vector map in parallel with the compatible video image signal, using the digital channel of the transmission link. Shifting the image items from one image to another ensures visual compatibility for the transmitted compatible video image.

According to another characteristic of the invention, the mulitplexing of image items from the images of pairs of images in the sequence is self-adapting with regard to the quantity of movement in the local or overall content of the current pair of images.

In this way, preference is given to spatial resolution or temporal resolution according to the quantity of movement in the local or global content of the current pair of images to be transmitted. The images or part-images not transmitted are reconstituted by linear filtering or by movement compensation (the movement information is calculated in the encoder and transmitted, following bit rate reduction, by means of segmentation, for example, to the decoder which reconstructs the image).

Other characteristics and advantages of the invention will emerge on reading the following description of a preferred embodiment and from the appended drawings.

DETAILED DESCRIPTION OF THE INVENTION

Known stereoscopic television systems use two video cameras mounted on a mechanical support controlling the stereoscopic base, the focal lengths, the planes and angles of convergence, etc. Each camera delivers a respective lefthand or righthand view, both views being transmitted to compatible or 3D television receivers using "MAC" type transmission, for example. There are two modes of 3D display, simultaneous mode and alternate mode. Alternate display mode stereoscopic television operate at high frame frequencies, for example 100 Hz. The 3D display is obtained by means of passive glasses along with a polarization of active screens applied to the television or by active glasses of the transparent ceramic type based on titanium zirconium doped with lead and lanthanum or liquid crystal type glasses.

Simultaneous display requires two independent projection tubes in the stereoscopic receiver, one for each view. A polarizer is provided to characterize each view, usually placed at the projector lens. Both views are projected simultaneously onto a non-depolarizing screen. The viewer wears polarized glasses selecting the appropriate view for each eye. Those skilled in the art are familiar with both these display techniques.

Figure 1:
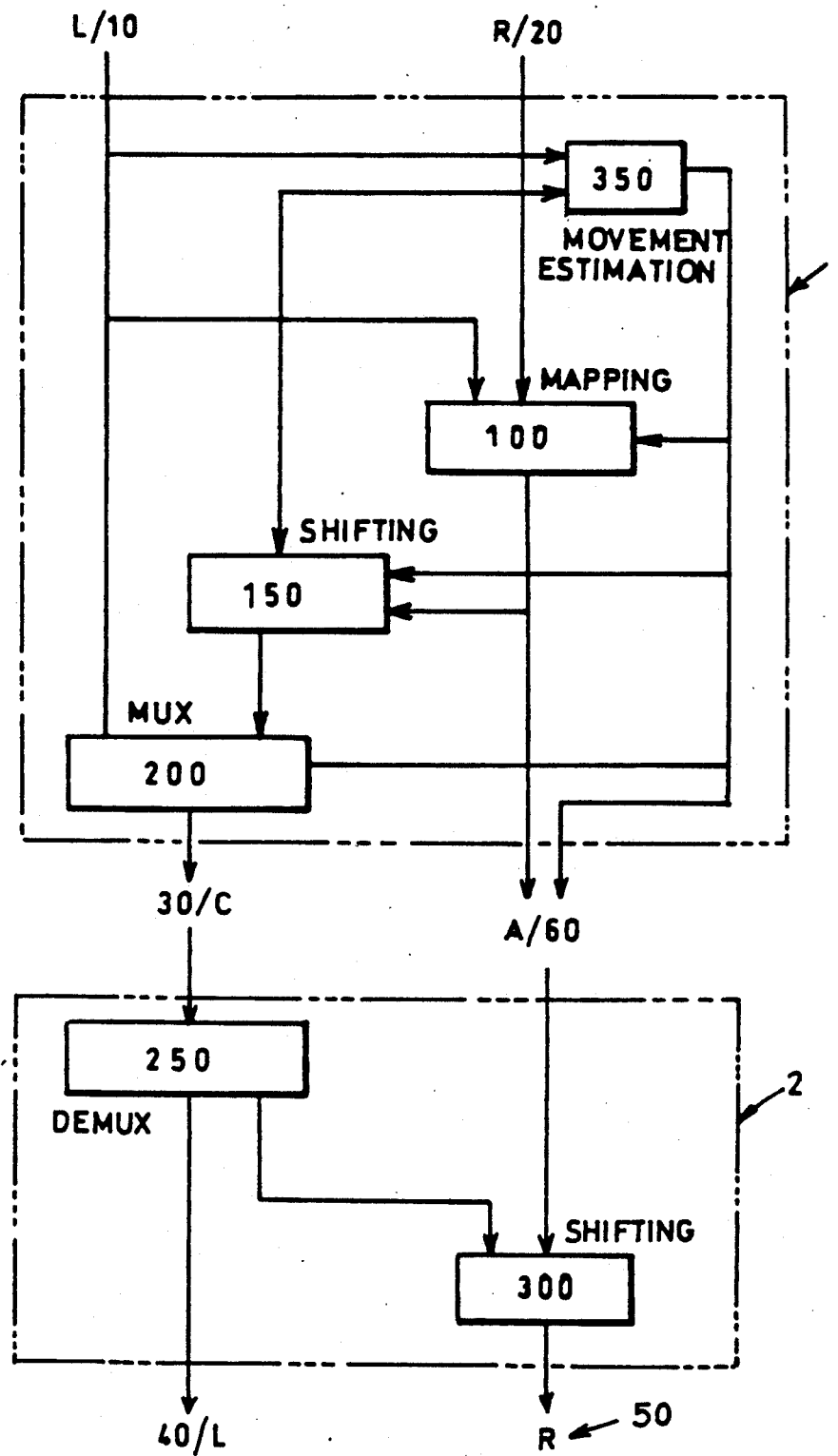
FIG. 1 is a general schematic of the method in accordance with the invention.

As shown in FIG. 1, the two cameras deliver a sequence of pairs of stereoscopic images each containing a lefthand image L/10 and a righthand image R/20. The sequence of pairs of images is applied to the input of an encoder 1 in which the images are pre-processed for transmission on the analog video channel of the transmission link of an image signal representing a compatible image 30/C and transmission on the digital data channel of assistance data A/60. The pre-processing of the sequence of pairs of stereoscopic images L/10, R/20 includes a first stage 100 in which the image items of a lefthand image L/10 and the image items of a righthand image R/20 are mapped, enabling the determination of a vector map constituting all or part of the assistance data A/60. This mapping stage is implemented by circuits (not shown) using methods familiar to those skilled in the art and can be applied to the righthand and lefthand images of the same current image pair at the input to the encoder 1 or to the righthand and lefthand images of successive different pairs of images in the sequence.

The mapping stage is followed by a stage 150 in which the image items in the righthand image R/20 are shifted relative to the image items of the lefthand image L/40 or vice versa, the righthand image and the lefthand image belonging to the current stereoscopic image pair or to successive different image pairs in the sequence. The image items from the lefthand image L/10 are multiplexed at 200 with the shifted image items of the righthand image R/20, with reference to information derived from the mapping process. The multiplexing stage produces at the output from the encoder 1 a compatible image signal 30/C combining signal elements from the lefthand and righthand images of stereoscopic image pair(s) of the sequence. The compatible video image 30/C can be reconstituted directly by a conventional television. The compatible video image signal intended for a stereoscopic television is transmitted together with assistance data A60 to a decoder 2 associated with the stereoscopic television. On entering the decoder 2 the compatible video image signal is demultiplexed at 250 to a supply a lefthand image 40/L and a righthand image R, following a stage 300 in which the image items are shifted again.

The method of the invention provides for adaptive multiplexing of image items of the righthand and lefthand images according to the space-time activity of the current image pair from the sequence, enabling dynamic stereovision. In dynamic stereovision, estimating the movement or monitoring the characteristics in each image sequence corresponding to the righthand view and to the lefthand view provides time data which is used to choose the multiplexing mode for transmitting of the image items (FIGS. 2B through 2D) and, where appropriate, to reconstruct frames not transmitted (independently of the lefthand and righthand views). The result of the movement estimation is provided by a selection function discriminating between rapid movement of the current image pair, a small movement or a very small movement corresponding to a fixed content of the image pair for at least two consecutive pairs in the sequence. As seen in FIG. 1, the movement is estimated at 350 for the sequence of current image pairs before the mapping stage, the result of the estimation being supplied to the input of the mapping, shifting and multiplexing stages.

Figure 2:
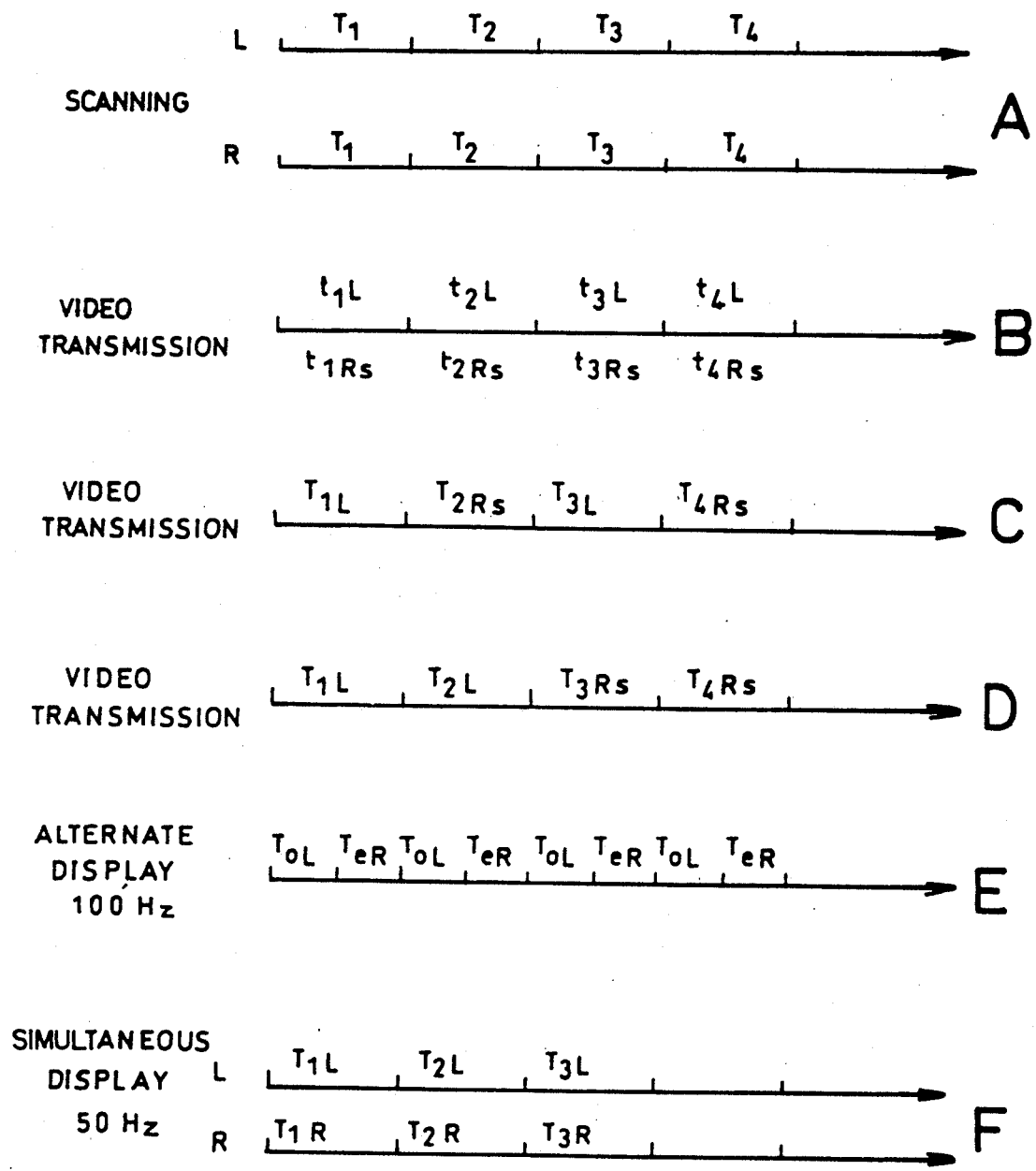
FIGS. 2A through 2F are a schematic representation of frames from the sequence of pairs of stereoscopic images of the scanning, of frames of the sequence of compatible video images transmitted and of frames of the sequence of stereoscopic images reconstituted in alternate or simultaneous mode.

The movement vectors field is transmitted in the digital channel as part of the assistance data A/60, following bit rate reduction, by segmentation, for example. In the simultaneous display mode (FIG. 2F) the method in accordance with the invention is adapted according to the result of the movement estimation. If the content of the current image pair of the sequence is recognised as a fast movement, it is preferable to favor temporal resolution. The image items from the righthand and lefthand images of the stereoscopic image pair are multiplexed, for example, by combining spatially and line by line a frame of a lefthand anamorphic image T1L with a righthand anamorphic image frame T1R which is shifted (see FIG. 2A) to constitute a composite frame T1L, T1Rs of the transmitted compatible video image at the output of the encoder 1, as seen in FIG. 2B. The spatial resolution of each righthand and lefthand image is reduced by anamorphism, that is to say by filtering and undersampling, and only the anamorphic righthand image is shifted. A linear filter process is provided in the decoder for applying the function which is the inverse of the anamorphic function to the image items transmitted after demultiplexing 250 and shifting 300 in the decoder 2. There is advantageously further provision for demultiplexing information relating to the movement vectors field prior to the linear filtering operation at the decoder 2.

If the content of the current image pair from the sequences is recognised as a small movement the temporal resolution and the spatial resolution are reduced T1L of a lefthand image followed by a shifted even frame T2R2 of a righthand image, or vice versa. Each successive frame of the compatible video image transmitted therefore represents the alternation of frames of each righthand and lefthand image from pairs of images of the sequence, as seen in FIG. 2C, the spatial resolution of the frames transmitted not being reduced. In addition to the mapping stage, it is necessary to provide additional processing, for example movement estimation, to supply information needed as assistance data to enable reconstruction by interpolation at the decoder 2 of non-transmitted frames of the righthand and lefthand images of image pairs from the sequence.

FIG. 2D shows the compatible video image frames from the transmitted sequence obtained by multiplexing image items from the righthand and lefthand images of the stereoscopic image pairs in the case of very small movement of their contents. In this case, the spatial resolution is preserved, meaning that two consecutive frames T1L, T2L of a lefthand image followed by two consecutive frames T3Rs, T4Rs of a shifted righthand image are combined temporally so that two successive frames of the compatible image transmitted represent alternately two successive frames of a righthand image or of a lefthand image of stereoscopic image pairs from the sequence. As previously discussed, additional processing enables reconstitution by interpolation of the missing images from one of the views, at the decoder using data obtained from this additional processing.

The new method favors the stereoscopic image by supplying in the decoder 2 associated with a stereoscopic television image items belonging to both views. The untransmitted image items belonging to the images corresponding to the righthand and lefthand views are reconstructed using the assistance data. Using the processing and transmission method in accordance with the invention, the stereoscopic image is not subject to the known defects of the prior art.

The sequence of compatible images transmitted enables non-3D display of acceptable quality because defects likely to show on a conventional television are largely eliminated by known filtering and contour smoothing processes, for example.

The embodiments described above are compatible for an alternative display mode stereoscopic television system (FIG. 2E). In alternate display mode, each reconstituted lefthand image always corresponds to an odd frame of the lefthand image and each reconstituted righthand image corresponds to an even frame of the righthand image. Because of this, each image displayed is always at half the vertical resolution and intermediate frames must therefore be interpolated.

One particular embodiment of the invention makes it possible to simplify the processing carried out at the decoder 2, in particular the temporal frequency conversion processing, in the case of alternate mode image reconstitution at 100 Hz, given that the righthand and lefthand views are scanned simultaneously and that the method of processing and transmitting the sequence of stereoscopic image pairs entails temporal combination of an odd frame of a lefthand image followed by an even frame of a righthand image to form the sequence of compatible video images as shown in FIG. 2C.

As can be seen in FIG. 2C, the original frames, T1L, T3L corresponding to the odd frames of the lefthand images of the sequence of stereoscopic image pairs are transmitted completely. When they are reconstituted in alternate mode at 100 Hz it is necessary to reconstitute the intermediate odd frames T1G, as shown in FIG. 2E, corresponding to the non-transmitted frames of the lefthand images of the sequence of pairs of images by means of temporal frequency conversion, the conversion processing at the decoder 2 being applied every two frames of the reconstituted righthand images. With regard to the reconstituted righthand images, all their corresponding even frames TpD are recalculated at the decoder by applying to them a disparity and temporal frequency conversion process.

According to the invention, the decoder 2 is advantageously made simpler by simplifying the associated processing. The simplification is achieved by calculating even frames corresponding to the reconstituted righthand images and in particular the temporal frequency conversion at the encoder 1.

By virtue of the pre-processing carried out at the encoder 1, the temporal frequency conversion is applied only every two even frames of the righthand images from the sequence stereoscopic image pairs. The odd frames of the lefthand images are then time-division multiplexed with the previously frequency converted even frames of the righthand images of the stereoscopic image pairs to constitute the sequence of compatible video images, the shifting operations still being necessary.

Of course, the invention is also compatible with a system provided with a lenticular array display. The further adaptations required consist essentially in interpolating n intermediate views in the decoder on the basis of data calculated in the encoder and transmitted from the latter.

Of course, the invention is not limited to the embodiment described and variants thereof may be put forward without departing from the scope of the invention.

There is claimed:

1. A method of processing and transmitting a sequence of pairs of right-hand and left-hand stereoscopic television images by means of a transmission link to reconstitute at a receiving end of the transmission link a compatible image or a three-dimensional image, said method comprising the steps of:
   a) mapping image items of the right-hand and left-hand images of said pairs of stereoscopic images to provide a vector map constituting assistance data;
   b) shifting the image items in a right-hand or left-hand image according to the image items of the other left-hand or right-hand image, respectively;
   c) multiplexing the image items of the right-hand and left-hand images provided by step b) to provide a compatible image; and
   d) transmitting said compatible image and said assistance data through said transmission link.

2. The method according to claim 1, wherein the multiplexing of the image items is self-adapting with regard to the quantity of movement in the local or overall contents of the pair of stereoscopic images.

3. The method according to claim 2, wherein the multiplexing of the image items of the right-hand and left-hand images of the pairs of stereoscopic images is carried out by combining spatially, line by line, one frame of an anamorphic left-hand image with one frame of an anamorphic right-hand image, or vice-versa, to constitute a composite frame of the compatible video image transmitted.

4. The method according to claim 2, wherein the multiplexing of the image items of the right-hand and left-hand images of the pairs of stereoscopic images is carried out by combining temporarily an odd frame of a left-hand image followed by an even frame of a right-hand image, or vice versa, so that each successive frame of the compatible video image transmitted represents alternate frames from each right-hand image and left-hand image of pairs of stereoscopic images.

5. The method according to claim 2, wherein the multiplexing of the image items of the right-hand and left-hand images of the pairs of stereoscopic images is carried out by combining temporarily two successive frames of a left-hand image followed by two successive frames of a right-hand image, or vice-versa, so that two successive frames of the compatible video image transmitted represent alternate successive frames of a right-hand image or left-hand image of pairs of stereoscopic images.

6. The method according to claim 5, wherein, prior to multiplexing, additional temporal frequency conversion processing is carried out on the even frames of the right-hand images of the sequence of pairs of stereoscopic images.

7. The method according to claim 1, wherein said transmission link has an analog video channel associated with a digital channel, and wherein said compatible image is transmitted through said analog video channel and said assistance data are transmitted through said digital channel.

* * * * *